(12) United States Patent
Korosy et al.

(10) Patent No.: US 7,198,075 B2
(45) Date of Patent: Apr. 3, 2007

(54) COMPOSITE SHEETING MATERIAL AND METHOD OF MANUFACTURE

(75) Inventors: John Korosy, Narre Warren (AU); Robert Korosy, Narre Warren (AU)

(73) Assignee: Global Polymer Technologies Pty Ltd., Hallam (AU)

( * ) Notice: Subject to any disclaimer, the term of this patent is extended or adjusted under 35 U.S.C. 154(b) by 382 days.

(21) Appl. No.: 10/500,359

(22) PCT Filed: Dec. 24, 2002

(86) PCT No.: PCT/AU02/01747

§ 371 (c)(1),
(2), (4) Date: Aug. 17, 2004

(87) PCT Pub. No.: WO03/055673

PCT Pub. Date: Jul. 10, 2003

(65) Prior Publication Data

US 2005/0037180 A1 Feb. 17, 2005

(30) Foreign Application Priority Data

Jan. 2, 2002 (AU) .................................... PR9792

(51) Int. Cl.
*B65B 43/42* (2006.01)
(52) U.S. Cl. ..................... 141/164; 141/134; 141/237; 428/166; 428/167; 264/46.5; 264/171.1; 264/261
(58) Field of Classification Search ................. 141/2, 141/18, 129, 132, 134, 163, 164, 234–237; 428/163, 166, 167; 264/46.5, 261, 171.1
See application file for complete search history.

(56) References Cited

U.S. PATENT DOCUMENTS

| | | | | |
|---|---|---|---|---|
| 3,090,078 A | * | 5/1963 | Ackles | 264/46.5 |
| 3,159,514 A | * | 12/1964 | McKnight, Jr. et al. | 155/79 |
| 4,330,494 A | * | 5/1982 | Iwata et al. | 264/46.2 |
| 4,602,466 A | * | 7/1986 | Larson | 52/309.11 |

FOREIGN PATENT DOCUMENTS

| | | |
|---|---|---|
| DE | 197 02 581 A1 | 8/1997 |
| FR | 2 615 446 A | 11/1998 |
| WO | WO 00/68001 A | 11/2000 |

OTHER PUBLICATIONS

Derwent Abstract Accession No. 88-004741/01, JP 62-270330 A; Shinwa Package KK); Nov. 24, 1987.
Derwent Abstract Accession No. 19124C/11, JP 55-014235 Ad; (Matsushita Elec. Works); Jan. 31, 1980.

* cited by examiner

*Primary Examiner*—Timothy L. Maust
(74) *Attorney, Agent, or Firm*—Nixon & Vanderhye

(57) ABSTRACT

A method of manufacturing a composite fluted sheeting material comprising at least two surfaces interspersed with a plurality of substantially parallel spaced webs forming a plurality of elongate semi closed cells (5), and a filler material set within said cells; the method including the steps of: (f) applying a blank fluted sheet to a receiving station (7); (g) preparing a filler material for delivery to a filling station; (h) moving said blank sheet and/or said filling station relative to each other such that said filling station moves in a linear direction transversely across the open ends of said elongate semi closed cells of said sheet; (i) dispensing said filler material to said cells; allowing said filler material to set.

36 Claims, 9 Drawing Sheets

COMPOSITE SHEETING MATERIAL AND METHOD OF MANUFACTURE

This application is the U.S. National Phase of International Application PCT/AU02/01747, filed 24 Dec. 2002, which designated the U.S.

INTRODUCTION TO THE INVENTION

This invention relates to sheeting materials incorporating a semi-closed cellular structure; including such products variously known as flute-board, core-board, corrugated board etc. In particular the invention relates to an improvement to the above products and a method of manufacturing such improved products.

BACKGROUND TO THE INVENTION

Sheeting materials as detailed in the introduction are popular products which find extensive use in industries as diverse as signage and general construction. These materials are generally produced in planar forms having at least two planar surfaces separated by a plurality of elongate webs forming a parallel series of elongate flutes or cells open at either end of the sheet. The flutes can be formed as an integral whole with the webs welded to the planar surfaces or by various methods of adhesion.

Such sheeting material exhibits a very high strength to weight ratio based on the rigidity derived from the torsion box principal. However, the strength and rigidity is not uniform over the sheet and is mainly found along the length of the flute webs. Accordingly, such materials exhibit a weakness when a bending moment is applied parallel to the flute webs, this weakness is found in the compression or failure of the planar surface between webs either side of the bending moment. Of course sheeting can be manufactured with cross web fluting to form completely closed cells, which result in the classic torsion box construction of considerable strength and rigidity in all dimensions. However, such a construction technique is complex and considerably more expensive to provide than the semi closed cell flutes of standard board considered so far.

Notwithstanding the disadvantages of such standard board, it has considerable merit and is available in a wide range of sizes, materials and configurations.

One object of this invention is to improve on the currently available materials, particularly in a manner to greatly enhance the current uses available for such products.

STATEMENT OF INVENTION

In one aspect the invention provides a method of manufacturing a composite fluted sheeting material comprising at least two surfaces interspersed with a plurality of substantially parallel spaced webs forming a plurality of elongate semi closed cells, and a filler material set within said cells; the method including the steps of:
 (a) applying a blank fluted sheet to a receiving station;
 (b) preparing a filler material for delivery to a filling station;
 (c) moving said blank sheet and/or said filling station relative to each other such that said filling station moves in a linear direction transversely across the open ends of said elongate semi closed cells of said sheet;
 (d) dispensing said filler material to said cells;
 (e) allowing said filler material to set.

The receiving station may include a transporting means which may be a conveyor adapted to move said blank fluted sheet in a linear direction co-planar with said sheet.

The filling station may be fixed relative to said receiving station.

The receiving station may be adapted to incline said sheet along the longitudinal direction of said cells to facilitate gravity assisted delivery of said filler to the cells where the filling station is positioned at the elevated end of said sheets.

The conveyor may include an upper and lower conveyor belt for receiving the upper and lower ends of said sheet. The upper conveyor may include a second jockey conveyor opposing the upper so as to sandwich said sheet to ensure full control of said sheet as it passes said filling station.

The filling station may include a mixing means and an injection head. The mixing means is adapted to mix the components of said filler prior to dispersing via said injection head. The injection head may include one or a plurality of nozzles adapted to cooperate with the open cell ends of the blank sheet. The nozzles may be adapted to advance and retract from the open end of sheet and be provided with a complaint stopper to assist in sealing the nozzle to the open cell ends. The movement of said injection head may be coordinated with the linear movement of the sheet such that the injection head advances to seal the open cell or a group of cells for filling, and then retracts to allow the sheet to move and present the next group of open cells for filling.

The filling station may be supplied with filler via a pumping station. The pumping station may be adapted to supply the filling station with a suitable filler in sufficient quantity and quality to achieve the necessary filling of each empty cell.

The filler material may be an expanding setting foam of the polyurethane type.

The foam is most preferably a multicomponent admixture adapted for rapid and expanding setting once mixed.

The polyurethane component of the foam may be selected from POLYOL™ forming the basis of the urethane foam and a suitable hardener. The preferred temperature of the polyurethane mix at injection into the cavities of the chute is approximately 22 degrees Centigrade.

In another aspect the invention provides a machine for use in accordance with the methods of the invention, said machine comprising
 (a) a receiving station adapted for receiving a blank fluted sheet having elongate semi closed cells;
 (b) a filling station for dispensing a filler into the cells of said fluted sheet.

The receiving station may include an inclined loading table having a conveying system for moving said fluted sheet in a linear direction transversely across the direction of said elongate cells.

The conveying system may include at least two conveyor belts at the upper and lower ends of the table to receive the upper and lower ends of the sheet applied to the receiving station.

The loading table is adapted for receiving a blank sheet and a transporting section adapted for moving the sheet in a controlled manner across the filling station.

The transporting section of the receiving station may include a second "jockey" conveyor opposing the upper conveyor belt over the length of the transporting section so as to ensure that the sheet is rigidly held and transported relative to the filling station to allow cooperation between the filling station and the sheet.

The filling station may be mounted to the receiving station in the vicinity of the transport section thereof for cooperation with the sheet moving past the station.

The filling station may include a mixing means and an injection head. The injection head being adapted for reciprocating movement to repeatedly abut and withdraw from the open end of said sheet with optional up and down movement to cater for multi layered sheeting. The movement of the injector head may be coordinated with the movement of the sheet to ensure that filler is systematically injected into consecutive cells of the sheet.

The injector head may include one or a plurality of nozzles adapted to extend into the open cells of the board during filling and withdraw from the cells as the injector head is withdrawn.

The injector head may also include a stopper to seal the injector head/sheet interface.

The machine may also include a pumping station for supplying the filler components to the filler station in the most preferred format.

The pumping station may include reservoir tanks for the filler components with output plumbing and pumps to provide a supply of filler components to the filling station. The reservoir tanks may include temperature control means to govern the temperature of the filler components as supplied to the filling station.

In another aspect the invention provides a composite sheet material when made in accordance with the previously described methods.

The invention will now be described with reference to the following figures which represent only one particularly preferred embodiment of the invention:

DETAILED DESCRIPTION OF THE INVENTION

The invention will now be described with reference to one particularly preferred embodiment as detailed in the accompanying figures.

Figure 1:
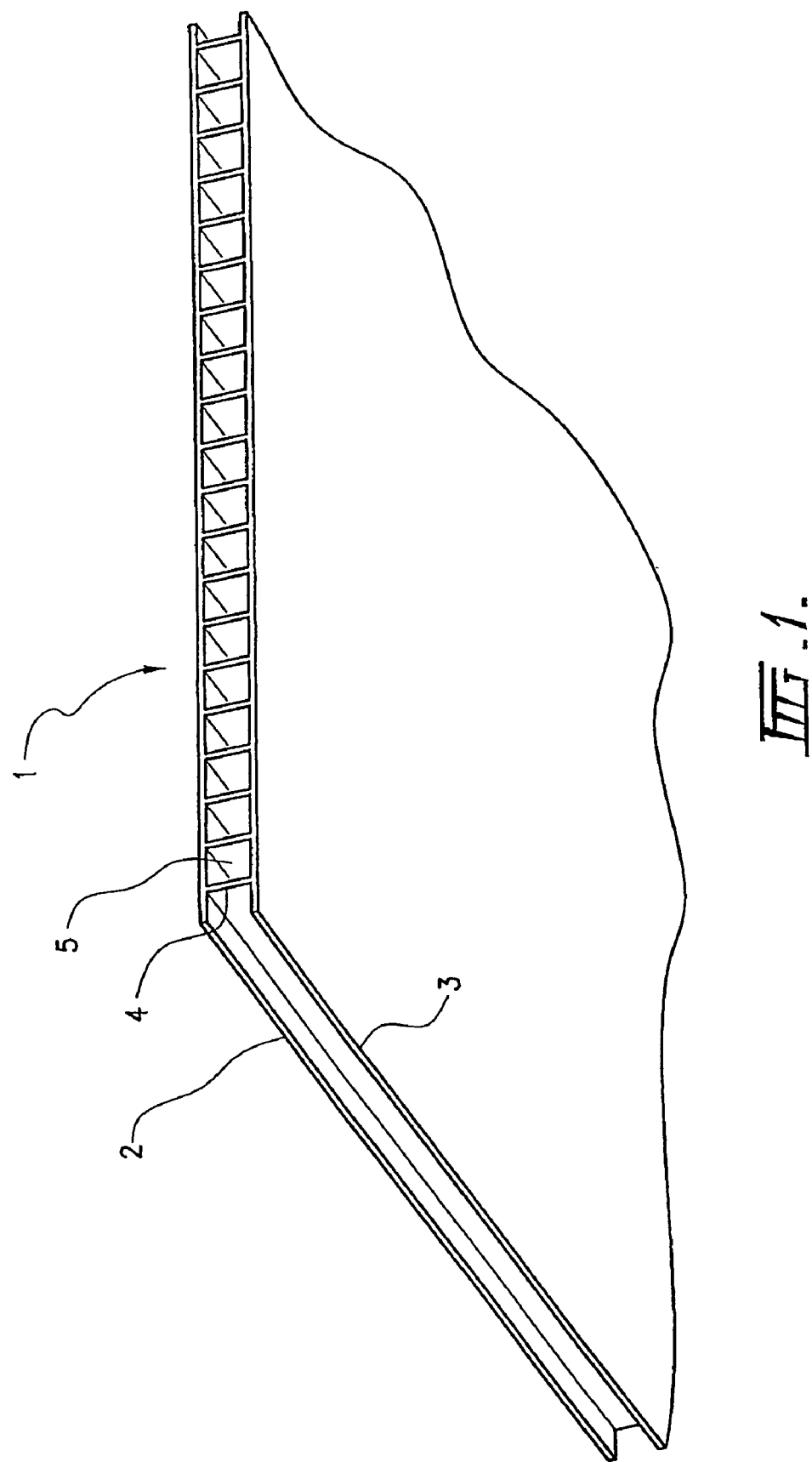
FIG. 1 shows a sample of the sheeting material used by the invention.

Referring firstly to FIG. 1, the component material on which the invention is based is shown in FIG. 1, where a section of flute board material 1 is shown. The flute board material is formed as a semi-rigid sheeting material having a first planar surface 2 and a second planar surface 3 separated by a plurality of parallel webs 4. The sheeting material thereby provides a series of parallel semi-closed cell cavities 5 running the length of the sheeting material. This sheeting material is readily available and as previously described, finds many current uses and applications in industries. The current invention is concerned with the use of this readily available and economical material as the initial component of a composite sheet having greatly enhances qualities and engineering characteristics over the original flute board sheeting material. The invention is concerned with providing a filling material for application to the semi-closed cell cavities of the sheet and includes the methods and machinery involved in the skillful application of a suitable filler material to the cavities of the sheeting product.

Figure 2:
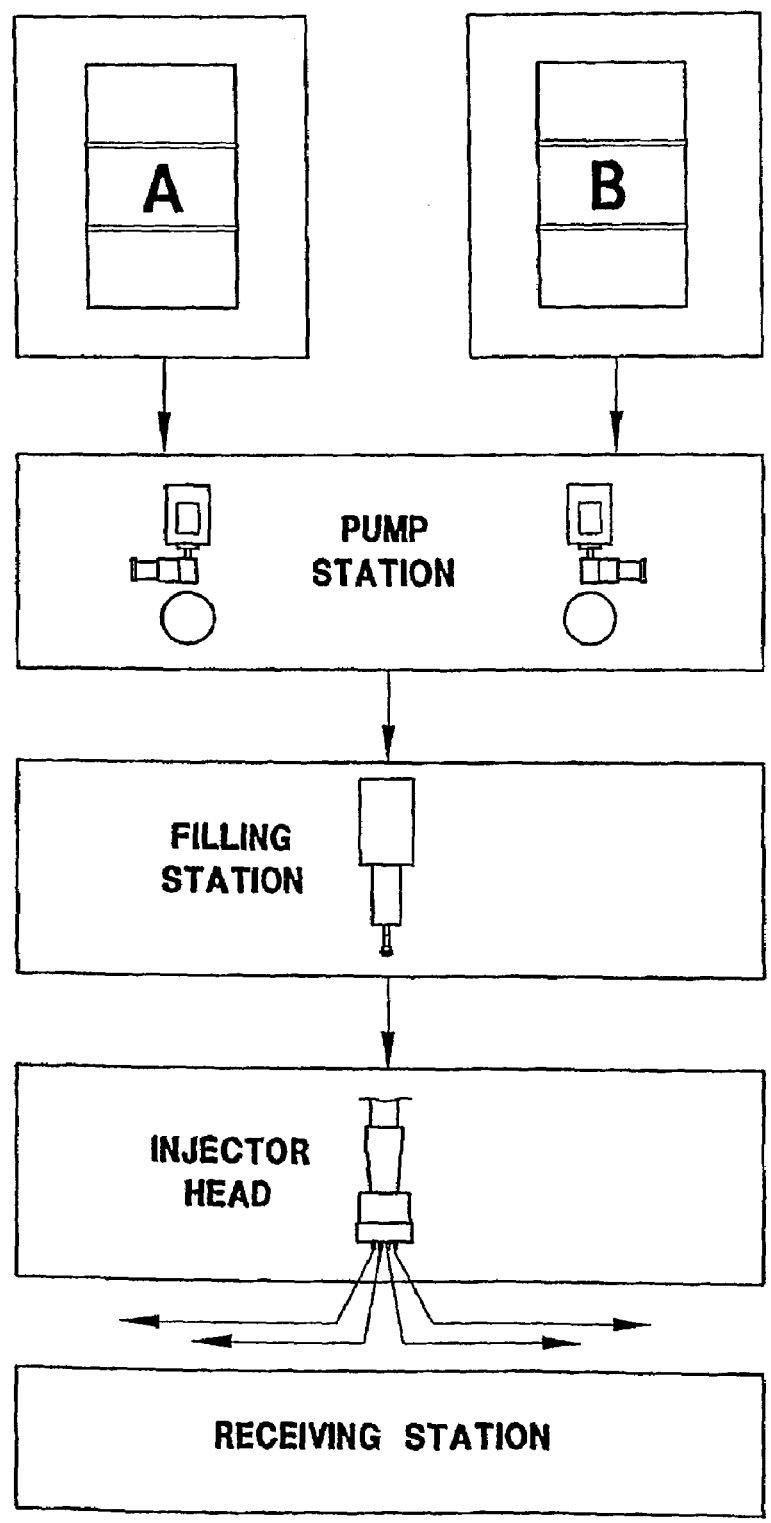
FIG. 2 shows a schematic representation of the method of the invention.

Referring to FIG. 2, the method of the invention is shown in schematic form where the filler materials including components A and B are supplied to a pump station for preparation and supply to a filling station. The filling station is adapted to mix the filler components and supply them to an injector head for injection into the cavities of the sheet material. The sheet material is presented to the injector head by way of a receiving station which coordinates the movement of the sheet to ensure systematic and controlled dispensing of the filler material to the cavities of the sheet.

The preferred filler material is a polyurethane foam of two components which instantaneously react upon mixing to begin foaming, expanding and setting. The particular viscosities and physical characteristics of the foam during the finite setting period require careful monitoring and the methodology of the invention is concerned with the automated dispensing of the filler material such that it can be passively supplied to an inclined sheet in sufficient and precise quantities and in a controlled environment such that the filler material supplied to the inclined cavities descends the length of the cavities by the action of gravity, without the need for pressure pumping and descends at a rate such that the foam begins to set as it reaches the bottom of the cavity and progressively hardens and sets up the cavity such that the full length of the cavity is progressively sealed with the setting foam filler material without causing air bubbles or loss of material down the open end of the cavity.

The method of the invention can be best understood with reference to the aspect of the invention including the machine for use in accordance with the method of the invention.

Figure 3:
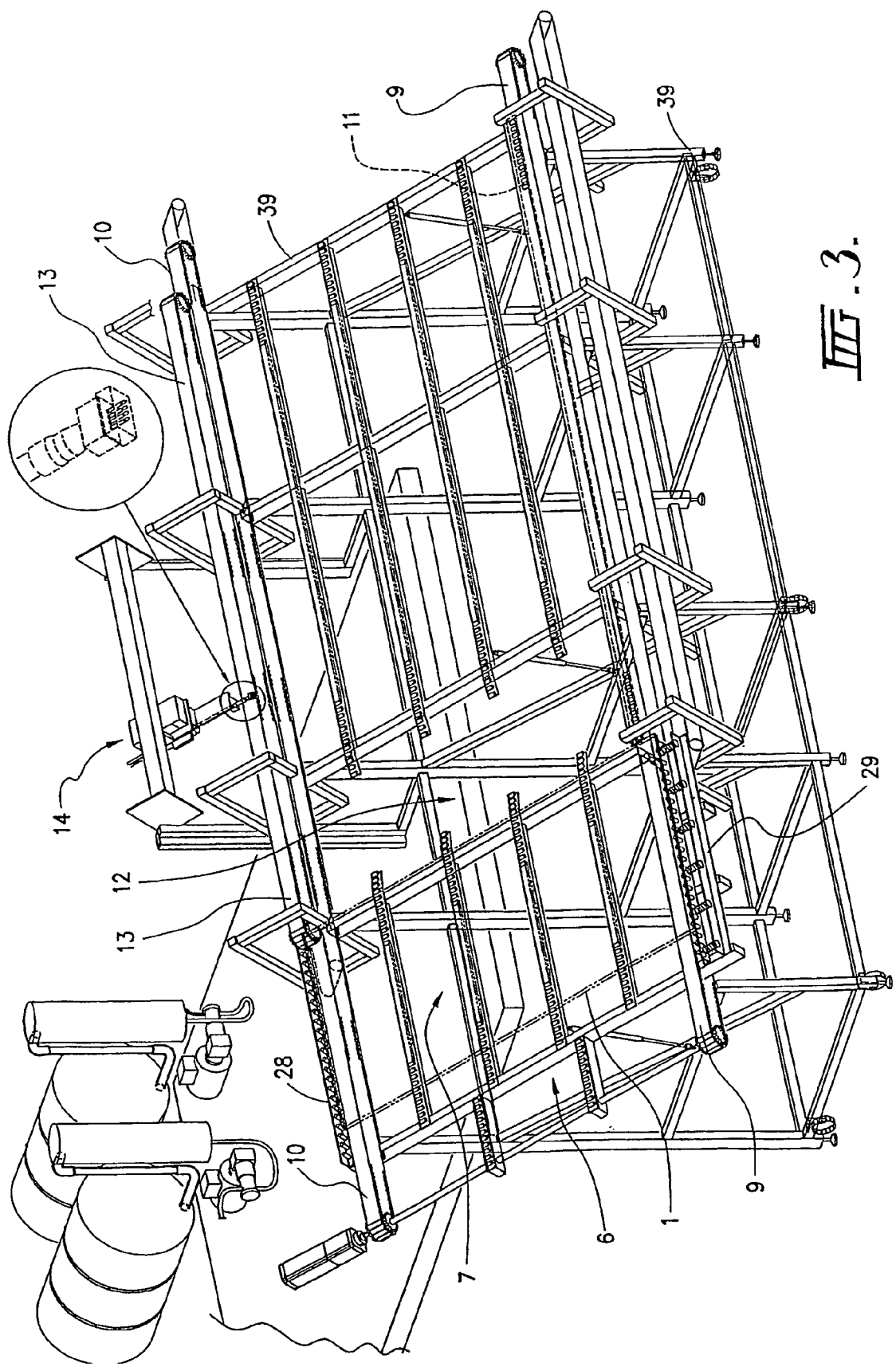
FIG. 3 shows a perspective view of the machine of the invention.
Figure 4:
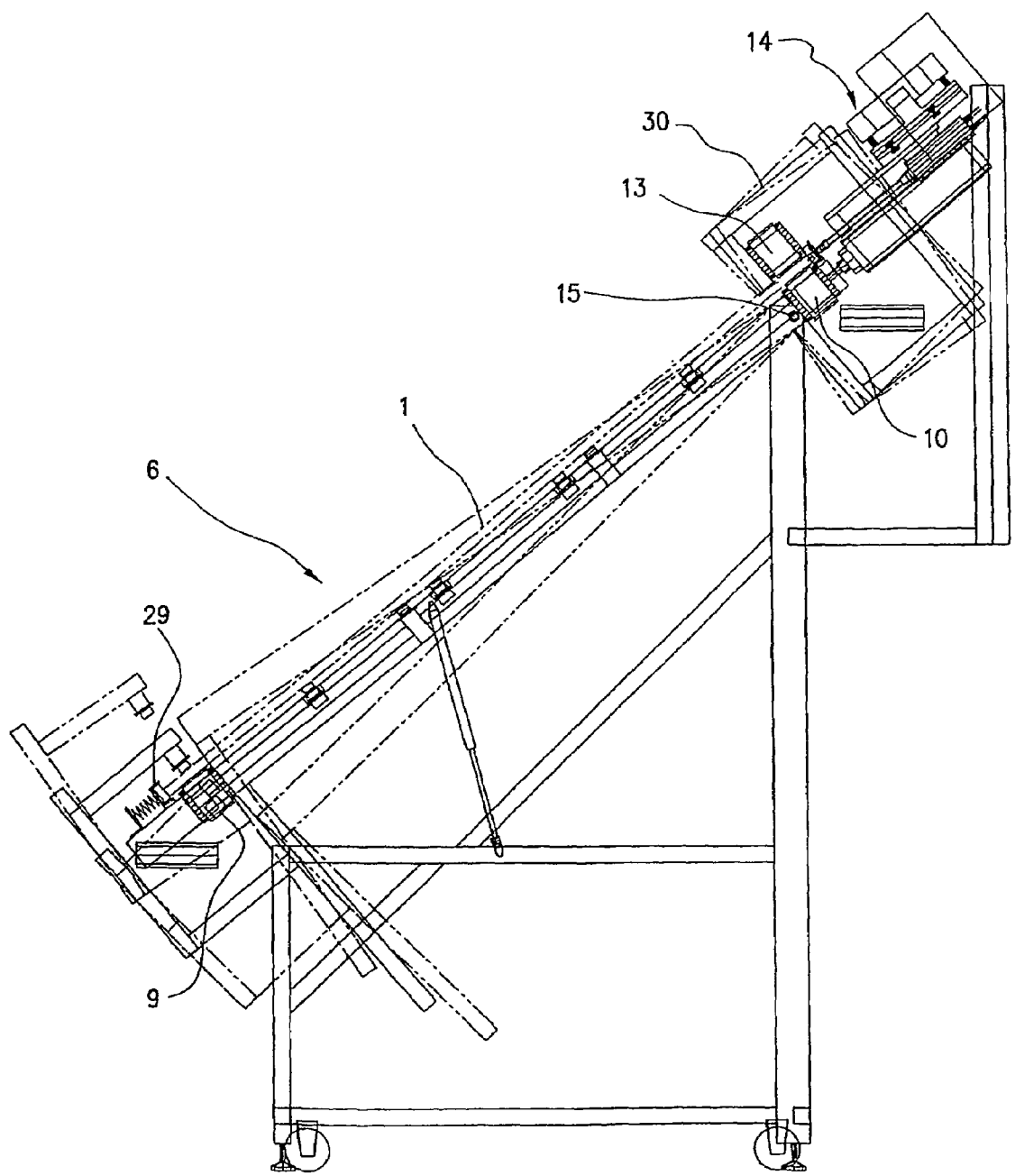
FIG. 4 shows a side view of the machine.
Figure 5:
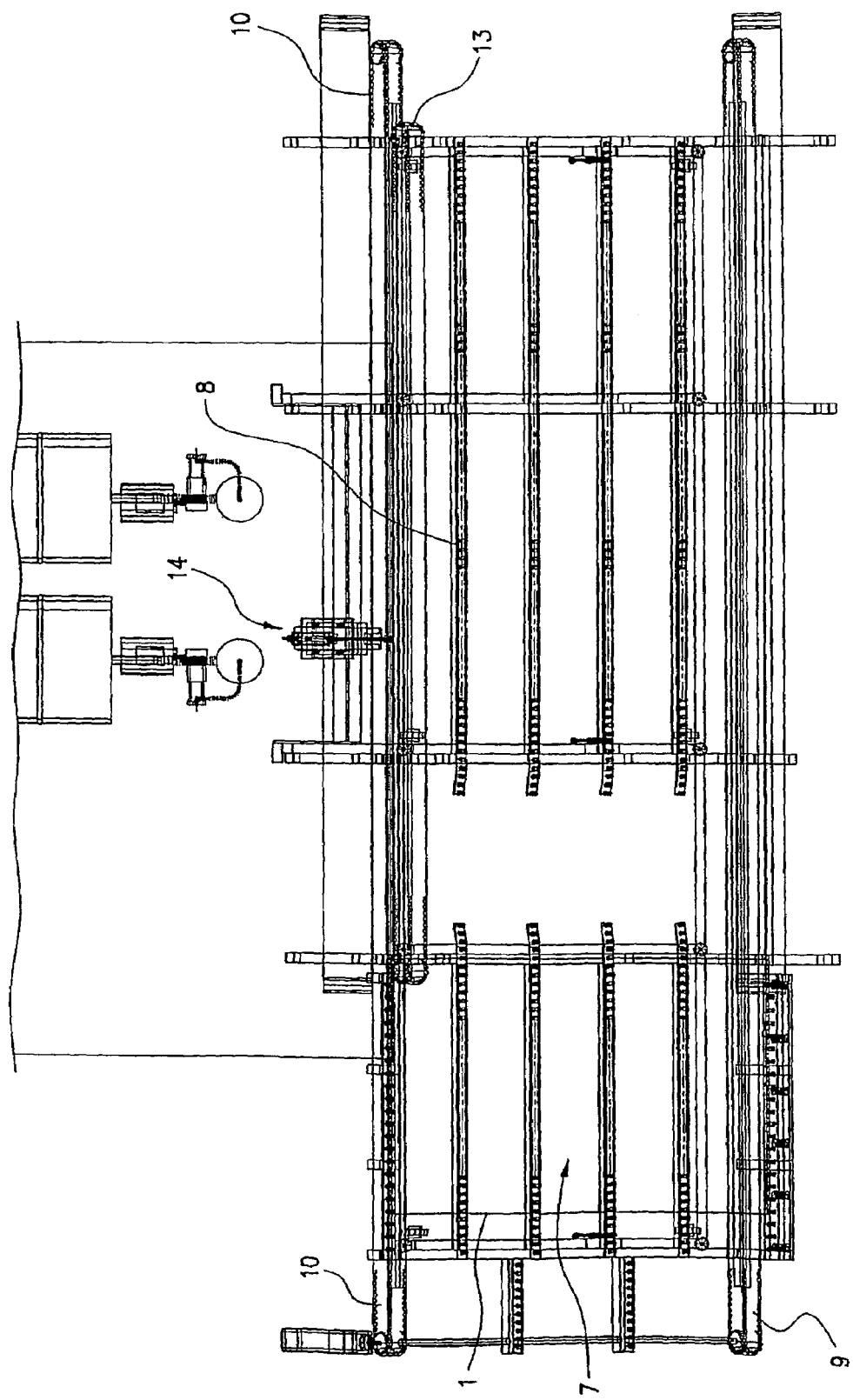
FIG. 5 shows a plan view of the receiving station.

Referring firstly to FIGS. 3, 4 and 5, various views of the machine of the invention are shown with the machine including an elevated and inclined receiving station 6 which provides an extended platform comprising a loading table 7 and a transporting section 8. The receiving station is provided with a lower conveyor 9 and an upper conveyor 10 adapted and spaced to receive the upper and lower ends respectively of a sheet of fluted board loaded on to said receiving station. The conveyors are adapted to move the sheet across the receiving station such that the cavities 5 are positioned in the inclined orientation so as to provide a slope to assist in the passive dispensing of filler material into the open cavities. The receiving station may be provided with an optional heating area 12 to assist in ensuring the optimal temperature of the sheet is obtained prior to filling. The sheeting material moves under the influence of the conveyors toward the transporting section 8 and upon reaching the transporting section, is engaged by a jockey conveyor 13 which is positioned to oppose the upper conveyor 10. In this manner, the upper end of the sheet is securely held between the two upper conveyors as it is transported past the filling station 14. As the top end of the sheet must be carefully aligned during passage past the filling station so as to allow accurate cooperation with dispensing of the foam filler, the top edge of a sheet must be carefully aligned and squarely presented at a constant distance to the filling station. The progress of the sheet is monitored by laser sensors to ensure accurate alignment is maintained. The loading table is provided with a pair of top roller bars 28 at a fixed position against which the sheet is abutted as it is placed on the upper conveyor and before being engaged by the jockey conveyor 13. The load table is also provided with a bottom roller bar 29 which is sprung and compliant so as to allow for any variations in the lower cut of the sheet and to ensure that the sheet is held snugly against the top roller bar.

Referring now to FIG. 4, the angle of the receiving station 6 can be clearly seen in its most preferred angle of inclination. The receiving station is however, pivoted at pivot point 15 so as to provide optional adjustments to the angle of inclination if so required. The positioning of the sheet 1 on the receiving station and its relationship with the lower 9 and upper 10 conveyors and the bottom roller bar 29 acting as a stop is clearly seen from this side view of the machine of the invention.

In order to provide consistency of alignment of the top end of the sheet with the receiving station 14, the receiving station is pivoted at point 15 and provided with a "c" shaped top end 30, to which the jockey conveyor 13 is attached. The pivot point 15 is provided at the top end of the table so as to minimise any alignment variations of the top sheet with respect to the filling station. The receiving station is adjusted by way of gas struts which effectively make the receiving station weightless and easy to adjust. In addition, the top "c" part of the receiving station is adjustable with bearing guides and gas struts to accommodate a variety of sheet thicknesses.

In order to assist in collection and disposal of waste filler that may escape from the bottom of the sheet cavities, the receiving station is provided with waste conveyors for receiving and transporting excess filler. The waste conveyors may be covered with a polyethylene film and waxed to aid in foam release.

Referring now to FIG. 5, the receiving station is shown in plan view where the loading section 7 can be seen to comprise a sufficient length of the receiving station to comfortably and accurately receive the sheet material and ensure adequate alignment with the lower 9 and upper 10 conveyors. The transporting section 8 comprises the bulk of the receiving station where the sheet is engaged by the upper and lower conveyors and an additional jockey conveyor 13. The filling station 14 is positioned approximately mid-way along the receiving station such that the sheet material is able to receive full support from the receiving station as it moves past the filling station such that the filling can be accomplished with the finished and filled sheet still completely supported by the receiving station.

Figure 6:
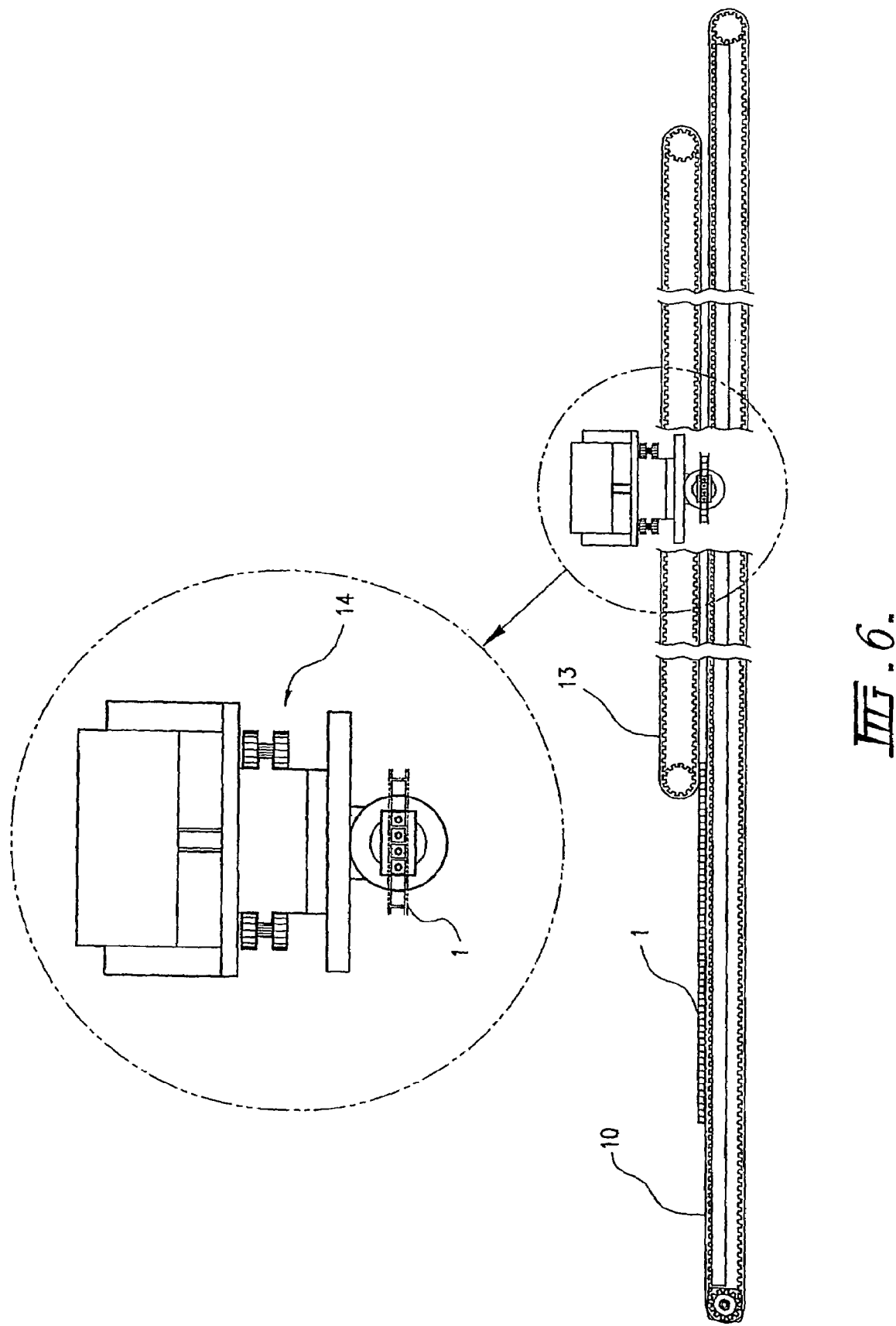
FIG. 6 shows detail of the transporting means as a series of conveyors.

Referring now to FIG. 6, details of the conveying system are shown with an end view of the upper conveyor 10 and a jockey conveyor 13 shown. The distance between the upper conveyor and the opposing jockey conveyor is sufficient to securely engage and transport the sheet past the filling station.

The movement of the conveyors is computer controlled to ensure coordinated movement of the sheet as it passes the filling station.

Figure 7:
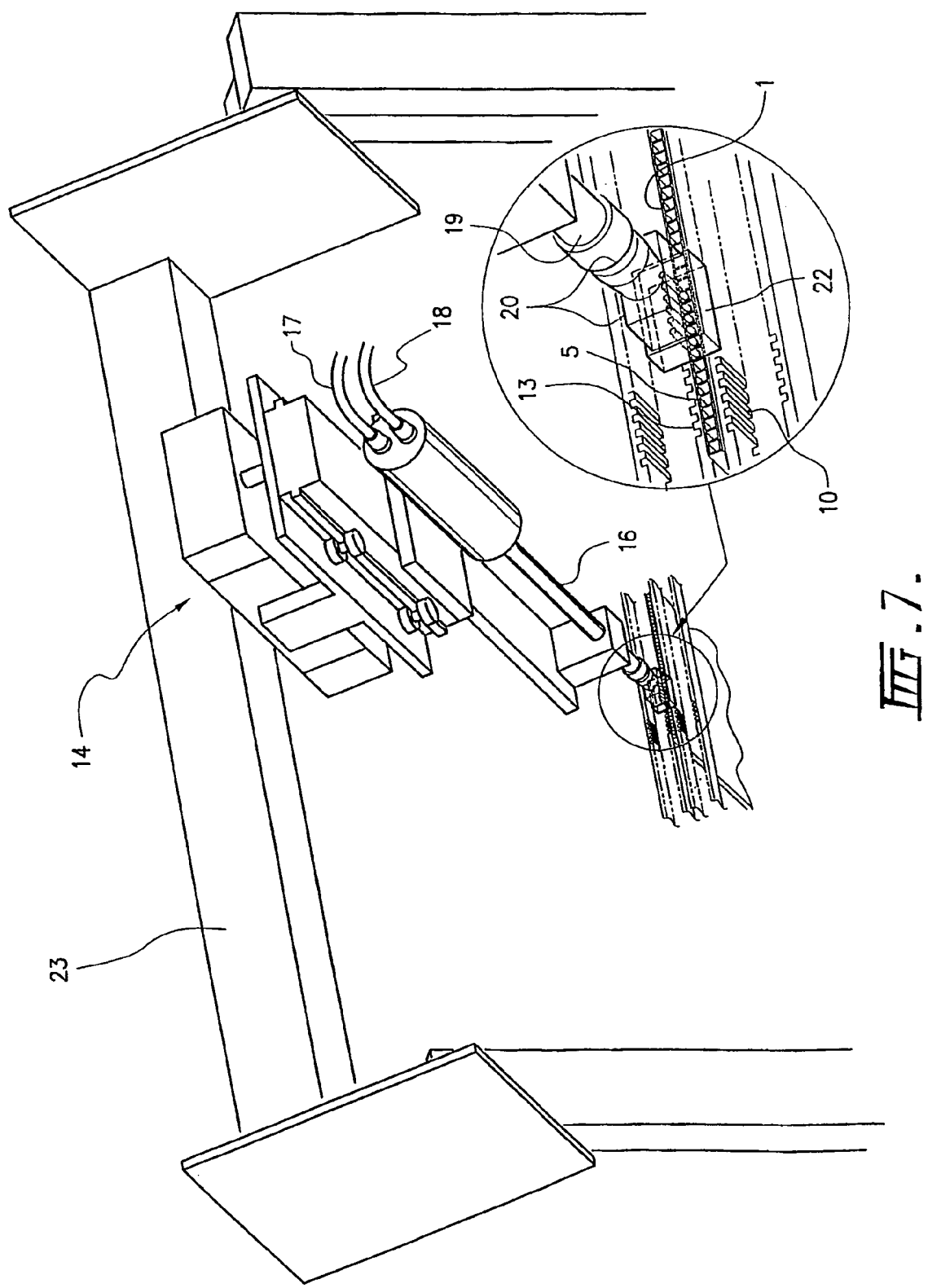
FIG. 7 shows the filling station.
Figure 8:
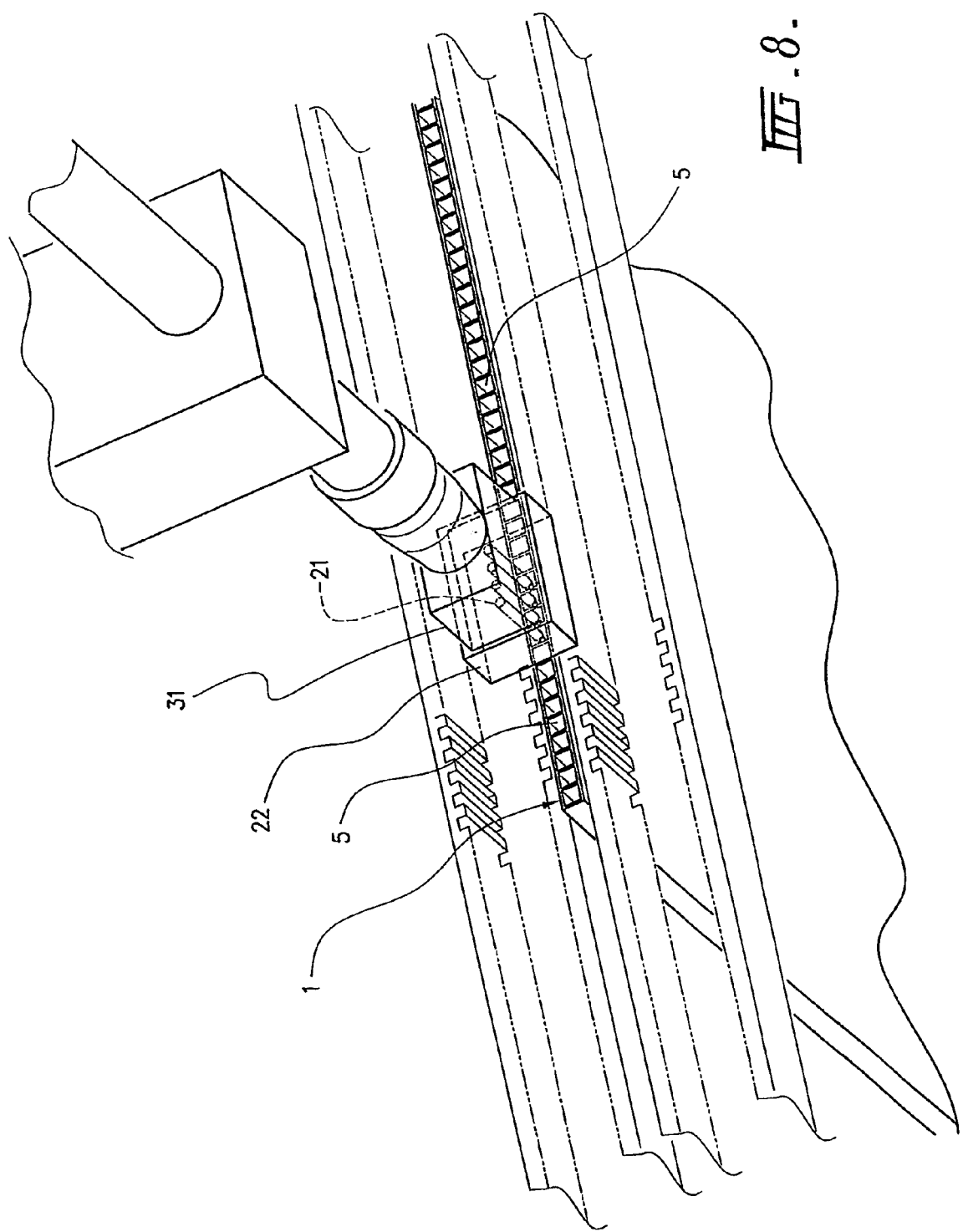
FIG. 8 shows the injector head in detail including the mixing means.

Referring now to FIGS. 7 and 8, the filling station is shown in perspective view from the underneath and from the rear of the machine. The filling station 14 comprises a mixing tube 16 adapted for receiving the filler components by way of supply hoses 17 and 18. The supply hoses feed the resin and hardener components of the filler into the mixing tube which takes the form of an elongate tubular mixing device for thoroughly churning and mixing the components of the filler material. The resin component of the filler may be aerated by micro-air nucleation to give bulk and buoyancy to the resin material. The air nucleation is applied after the resin is supplied to the filling station and prior to entry to the mixers tube where the degree of aeration may be balanced to the pressure inside the mixing tube and manifold. The balancing of the air nucleation can be accomplished by adjusting the air nucleation jet size and the air pressure. At the distal end 19 of the mixing tube is fitted an injector head 20 for receiving the mixed filler and distributing same through a plurality of nozzles 21. The injector head is also provided with a compliant stopper 22 which is adapted to cooperate with the exposed ends of the sheet 1 to ensure leak-free dispensing of the filler into the sheet cavities 5. The filling station is fitted relative to the receiving station by way of a mounting means 23. The injector head and mixing means are adapted for axial reciprocating movement to and fro so as to allow the filling station to be advanced and retracted to and from the sheet 1 as the sheet is moved progressively across the transporting section 8 of the receiving station. In addition, the injector head may be moved up and down to accommodate double, triple etc layered sheeting. The use of double, triple, quadruple etc layered sheeting can provide additional strength and flexibility in design and structural specifications and with suitable adjustments and computer settings, the injector head can be modified to move up and down and/or across, so as to fill the layers of fluted board in a progressive manner, so as to minimise any potential distortion that may occur if an upper or lower layer were filled in its entirety, prior to filling of any subsequent layers. In its most preferred form, such multiple layered sheeting would be filled progressively up and down so as to effect a steady linear process across the face of the board. In this manner, the filler material is supplied under moderate pressure only to the filling station and the sheet material is progressed forward such that vacant cavities 5 are exposed to the injector head. The injector head is then advanced such that the stopper 22 is brought to bear on the end of the preferred number of cavities, for example, four cavities. Once the injector head has been brought to bear on the cavities, the rubber stopper ensures a leak-free seal and the nozzles 21 are sufficiently protruding from the injector head to ensure discreet dispensing of mixed filler material into the separate cavities 5. At this stage, the filler material is passively dispensed into the vacant cavities and the rate of dispensing is sufficient to allow the cavity to fill up as the filler reacts towards the bottom of the cavity. Whilst the filler is dispensed into the open cavities passively, it is nevertheless injected at the maximum flow rate governed by the viscosity and consistency of the pre set filler mixture and the stopper 22 ensures that backsplash of the filler from the top of the cavity is prevented. The nozzles 21 can be provided in a variety of sizes dependent on the choice of filler viscosity and consistency. The nozzles 21 are provided on a manifold 31 which is adapted for ready removal and cleaning to aid in maintenance. Once the cavity has been filled, the injector head is retracted and the sheet is then progressed to align the next block of cavities with the injector head which is then advanced to fill the next set of cavities.

In an additional step, the manufacturer of the fluted board may incorporate the progressive filling of the cores or flutes of the board and specifically omit the filling of one or more cores or flutes, so as to provide a finished product with compliance and flexibility about the vacant cores or flutes. In addition, such vacant cores or flutes, may be accommodated by strengthening rods or other various physical or performance specific devices down the vacant flutes, for example, electronic or electrical componenetry could be accommodated in accordance with the final specifications for the product in question.

The start/stop motion of the machine and the repeated movement and abutting of the injector head against the sheet may pressure the sheet to slide down the table. Accordingly, the conveyors are provided with a thick soft and tacky synthetic rubber sole to ensure adequate grip on the sheets to prevent any such slip. The injector head and mixing means may be provided with air hose and washing hose facilities such that the mixing tube and injector head can be cleaned after each production run to assist in routine maintenance.

Figure 9:
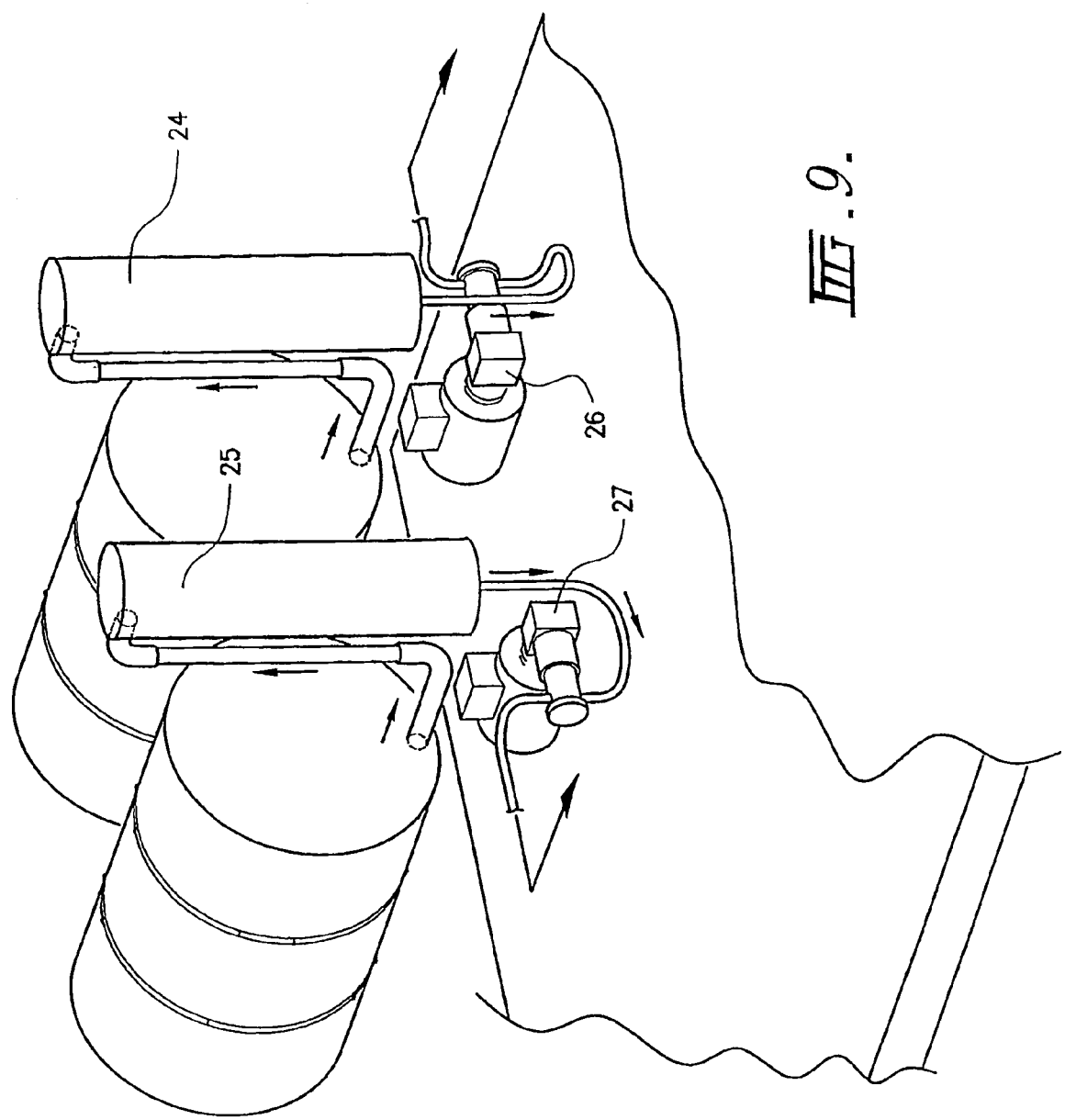
FIG. 9 shows the pumping station.

The filling material is supplied by way of a pumping station which is detailed in FIG. 9. The pumping station comprises two reservoir tanks, 24 and 25 which receive the bulk components of the filler materials from the bulk supply. The bulk components of the filler materials may be supplied with low pressure nitrogen gas to ensure the contents remain moisture free and create a positive pressure to feed the filler components to the reservoir tanks. The filler material is most preferably a standard grade urethane foam of about 40 to 60 kg/m$^3$. The filler material is made up of urethane foam, resulting from the reaction of the resin and hardener. The hardener can be selected from a range of solvent based or water based catalysts, dependent on the performance specifications of the product required.

The reservoir tanks are provided with temperature control means to ensure the components of the filler are at the optimum temperature.

In this manner, the make-up of the filler material can be fully and carefully controlled so as to ensure the appropriate viscosity and temperature of the filling material is supplied to the filling station. Upon mixing and dispensing into the cavities 5, the filler is caused to flow down the inclined cavities at an appropriate rate such that by the time the filling material has almost reached midway along the cavity it has set or began to foam into a cream consistency which immediately binds to the inside of the cavity. At that stage the foam begins to expand both directions up and down the cavity to back fill to the top and bottom of the cavity and then set to a hard filler.

The methods and machinery of the current invention provide for the first time a practical and economical method of value adding to a currently obtainable flute board sheeting material. The resultant material which forms part of the invention provides a highly rigid lightweight, durable, workable and robust building and construction material. The enhanced composite sheet of the invention provides many advantages over the currently available fluting materials including the ability to be welded and joined, plus of course, the highly enhanced rigidity and strength in all dimensions over that currently available from the untreated fluting material.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of manufacturing a composite fluted sheeting material comprising at least two surfaces interspersed with a plurality of substantially parallel spaced webs forming a plurality of elongate semi closed cells, and a filler material set within said cells; the method including the steps of:
    (a) applying a blank fluted sheet to a receiving station;
    (b) preparing a filler material for delivery to a filling station;
    (c) moving said blank sheet and/or said filling station relative to each other such that said filling station moves in a linear direction transversely across the open ends of said elongate semi closed cells of said sheet;
    (d) dispensing said filler material to said cells;
    (e) allowing said filler material to set.

2. A method according to claim 1 wherein said receiving station includes a transporting means for moving said blank fluted sheet in a linear direction coplanar with said sheet.

3. A method according to claim 2 wherein said transporting means includes a conveyor means.

4. A method according to claim 1 wherein said filling station is fixed relative to said receiving station.

5. A method according to claim 1 wherein said receiving station includes an inclined loading table adapted to incline said sheeting material positioned thereon in a direction longitudinal to said cells.

6. A method according to claim 5 wherein said fitting station is positioned at the elevated end of said inclined sheets to facilitate gravity assisted delivery of said filler to said cells.

7. A method according to claim 3 wherein said conveyor means includes a plurality of conveyors.

8. A method according to claim 7 wherein said conveyors include an upper and lower conveyor to receive the upper and lower ends of said sheet respectively.

9. A method according to claim 8 wherein the upper conveyor means includes a jockey conveyor adapted to oppose said upper conveyor so as to sandwich the upper end of said sheet.

10. A method according to claim 9 wherein said jockey conveyor operates at least in the region of said filling station.

11. A method according to claim 1 wherein said filling station includes a mixing means which may be a mixing tube, and an injection head.

12. A method according to claim 11 wherein said injection head includes a nozzle assembly configured to cooperate with the open cell ends of said blank sheet.

13. A method according to claim 12 wherein said nozzle assembly is adapted to move between an advanced and retracted position so as to allow said nozzle assembly to be moved into and out of said open cells.

14. A method according to claim 13 wherein said nozzle assembly includes a compliant stopper to assist in sealing at the open cell ends of said sheet during filling when said nozzle assembly is in said advanced position.

15. A method according to claim 12 wherein said nozzle assembly includes one or a plurality of nozzles.

16. A method according to claim 13 wherein the movement of said injection head is coordinated with the linear movement of said sheet such that the injection head advances to seal the open cell or cells of said sheet for filling and retracts to allow said sheet to move laterally and present empty cells for filling.

17. A method according to claim 1 wherein said filler material is delivered by a pumping station.

18. A method according to claim 1 wherein said filling material is an expanding setting foam.

19. A method according to claim 18 wherein said foam is a polyurethane.

20. A method according to claim 19 wherein said foam is adapted for rapid and expanding setting once mixed.

21. A method according to claim 20 wherein said foam is based on polyurethane™ resin and a suitable hardener.

22. A method according to claim 21 wherein said resin is subjected to micro-air nucleation post supply to said filling station and prior to entry to said mixing tube.

23. A method according to claim 1 wherein said filler is dispensed at a temperature of about 22 degrees centigrade.

24. A machine for use in accordance with the method of claim 1 comprising:
 (a) a receiving station adapted for receiving a blank fluted sheet having elongate semi-closed cells; and
 (b) a filling station for dispensing a filler into the cells of said fluted sheet.

25. A machine according to claim 24 wherein said receiving station includes an inclined loading table and a transporting means for moving said blank fitted sheet in a linear direction coplanar with said sheet.

26. A machine according to claim 25 wherein said transporting means includes a conveyor means.

27. A machine according to claim 26 wherein said conveyor means includes two conveyor belts positioned at the upper and lower end respectively of said inclined loading table to receive the upper and lower end of said fluted sheet.

28. A machine according to claim 27 wherein said transporting means further includes a jockey conveyor belt opposing said upper conveyor belt at least in the region of said filling station.

29. A machine according to claim 24 wherein said filling station is mounted to said receiving station.

30. A machine according to claim 24 wherein said filling station includes a mixing means and an injection head.

31. A machine according to claim 30 wherein said injection head is adapted for reciprocating movement to repeatedly advance toward and retract away from the open cells of said sheet.

32. A machine according to claim 30 wherein said injection head includes a plurality of nozzles adapted to extend into said open cells during filling and retract out of said open cells as the injector head is withdrawn.

33. A machine according to claim 30 wherein said injector head includes a stopper to seal the injection/sheet interface.

34. A machine according to claim 24 including a pumping station for supplying filler components to said filler station.

35. A machine according to claim 34 wherein said pumping station includes temperature controlled reservoir tanks for the filler components.

36. A composite sheet material made in accordance with the method of claim 1.

\* \* \* \* \*